United States Patent [19]

Sipin et al.

[11] 4,292,574

[45] Sep. 29, 1981

[54] PERSONAL AIR SAMPLER WITH ELECTRIC MOTOR DRIVEN BY INTERMITTENT FULL-POWER PULSES UNDER CONTROL, BETWEEN PULSES, OF MOTOR'S BACK ELECTROMOTIVE FORCE

[75] Inventors: Anatole J. Sipin, New York; Herbert R. Carleton, Setauket, both of N.Y.

[73] Assignee: Anatole J. Sipin Company, New York, N.Y.

[21] Appl. No.: 141,687

[22] Filed: Apr. 18, 1980

[51] Int. Cl.³ .................................... H02P 5/16
[52] U.S. Cl. .................... 318/331; 318/345 CA; 318/490; 318/459
[58] Field of Search ............... 318/331, 490, 345 CA, 318/341, 459

[56] References Cited

U.S. PATENT DOCUMENTS 3,624,474 11/1971 Nolf ........................................ 318/331
3,683,253 8/1972 Rummel et al. .................... 318/331
3,803,470 4/1974 Vosteen ............................. 318/331
3,997,869 12/1976 Mayer ................................ 318/490

*Primary Examiner*—David Smith, Jr.
*Attorney, Agent, or Firm*—Eric P. Schellin

[57] ABSTRACT

Constant selected speed running of an electric motor, with a varying mechanical load, is achieved by intermittently pulsing the motor at full power and comparing the back EMF of the motor, between power pulses, with a selected speed voltage, to accordingly control application of the power pulses. A particular control circuit is disclosed which permits operation of a pocket-sized system, powered by a three cell battery, to achieve substantially constant speed, at normally varying loads, throughout a ten hour period, with back EMFs at selected values between 0.01 volt (motor barely turning) and 2.0 volts (high speed). The system is useful in a personal air sampler, used to monitor a workman's exposure to noxious ingredients of breathing air.

8 Claims, 10 Drawing Figures

PERSONAL AIR SAMPLER WITH ELECTRIC MOTOR DRIVEN BY INTERMITTENT FULL-POWER PULSES UNDER CONTROL, BETWEEN PULSES, OF MOTOR'S BACK ELECTROMOTIVE FORCE

CROSS REFERENCE TO RELATED APPLICATIONS

This application is not related to any copending applications.

BACKGROUND AND SUMMARY OF INVENTION

In the industrial work place, toxic substances are often found in the air. The permissible level of exposure is set by government regulations, and compliance therewith requires that the breathing air be monitored. This is best done when the workman wears a personal air sampler, which continuously sniffs the ambient air during the 8 hour long workday. Such a personal sampler may, for example, be worn in a shirt pocket and will slowly suck ambient air through a combined filter-indicator tube by means of a dry-cell powered electric pump.

An early example of such a personal air sampler is that of Garner, U.S. Pat. No. 3,410,059. This sampler tends to suck the ambient air fast at first, and then slower, as the filter-indicator tube gradually clogs up and the batteries run down. Thus, the indication is not linearly representative of each work hour, but over emphasizes conditions earlier in the day, when the work place might be less messed up and less dangerous.

The later developed personal air sampler of Sipin, U.S. Pat. No. 3,953,152, is an improvement, since, by use of a voltage control circuit and, by restricting the motor operating conditions to avoid high IR losses, the motor speed does not vary very much, over the course of the work day, from that selected.

The instant system is an improvement on the prior art in that the speed of the motor is controlled to be substantially constant over the course of the work day, despite slow clogging of the filter-indicator tube and despite running down of the batteries.

In order to maintain the speed of the motor constant at its selected value, the actual speed of the motor is measured by continuous monitoring of the armature voltage through a linear voltage following amplifier having a signal voltage output differentially combined with a reference voltage of the desired value to produce an error signal, which is used as a feedback signal to control the application of power to the motor. Furthermore, the actual speed is not measured by use of a separate tachometer, but by sensing the internal back EMF of the motor through the linear voltage following amplifier during the intervals (when it is coasting) between short pulses of full voltage to the motor terminals, the signal voltage output of the amplifier being cut off for the duration of such pulses. The use of short pulses at full voltage permits successful operation of the system at very low motor speeds, where friction would prevent proper operation using steady d.c. of low terminal voltages.

The system described herein has two aspects. On the one hand, an improved personal air sampler is achieved. On the other hand, the herein disclosed new electric motor control circuit, generally useful in other applications, is used in the personal air sampler.

THE DRAWINGS

Figure 2:
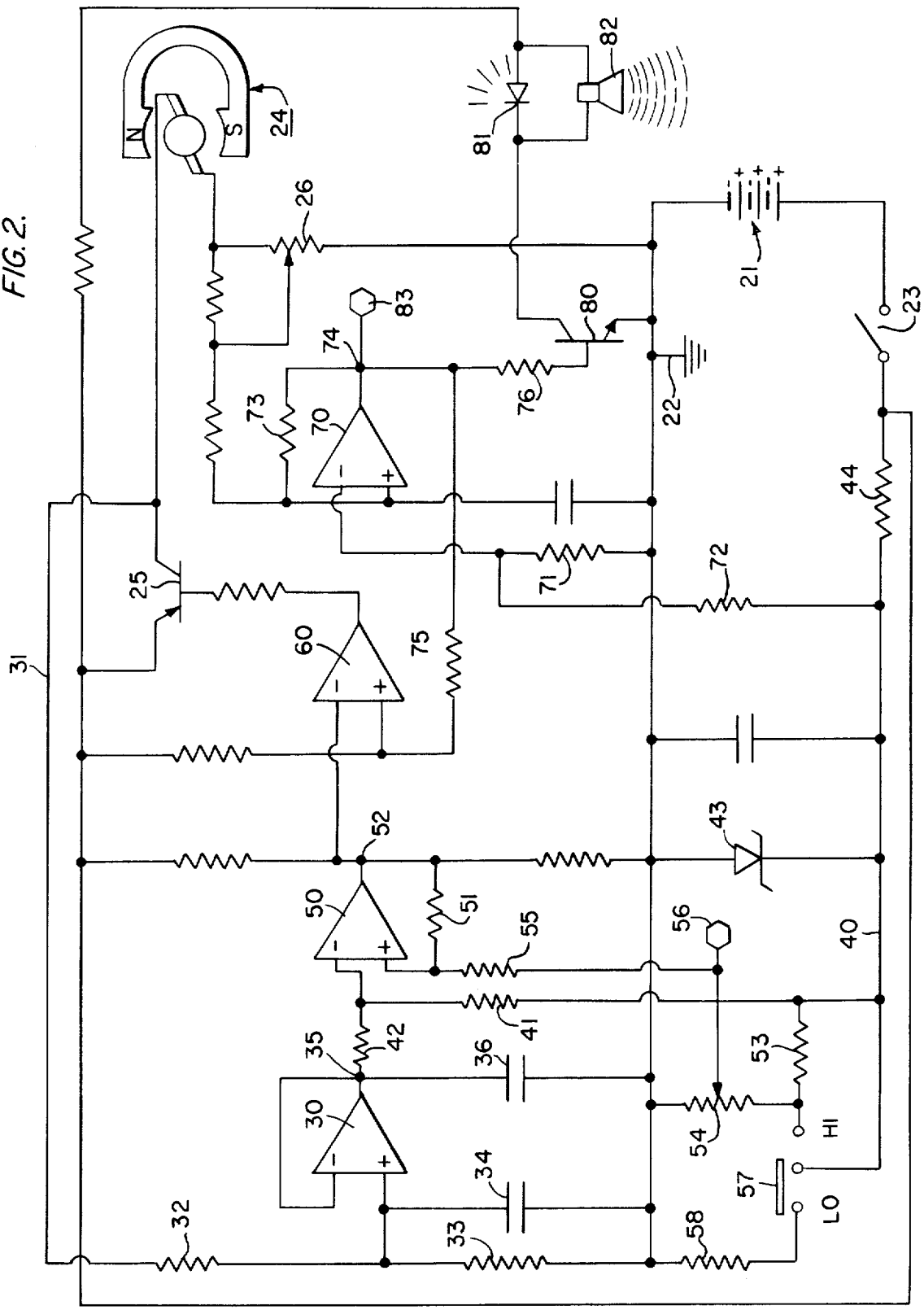
FIG. 2 is a circuit diagram of the personal air sampler.
Figure 5A:
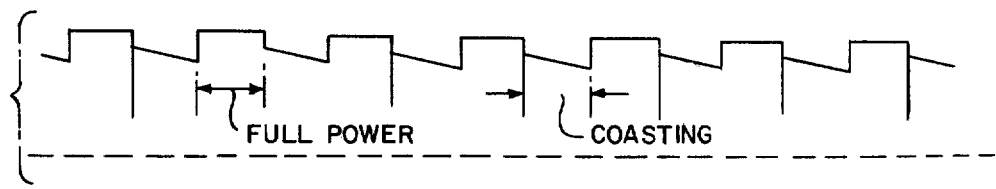
Figure 5B:
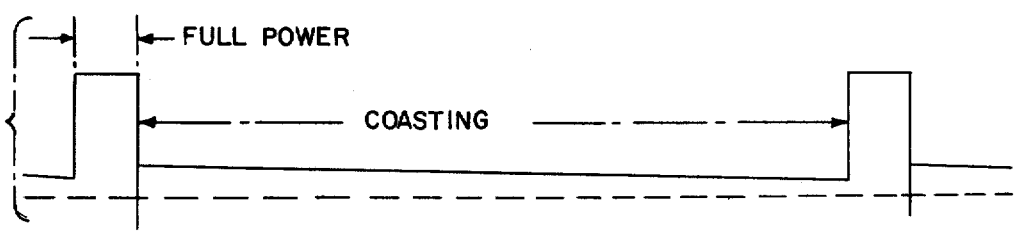
Figure 6A:
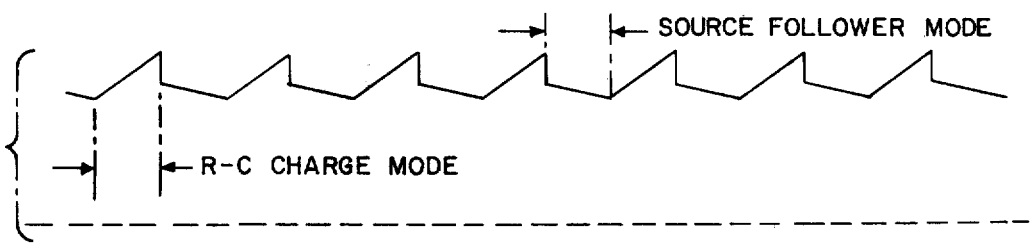
Figure 6B:
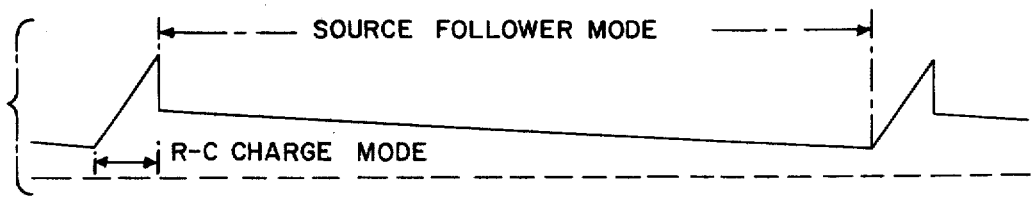
Figure 7A:
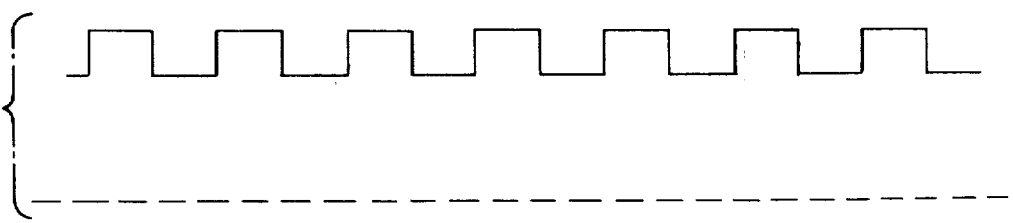
Figure 7B:
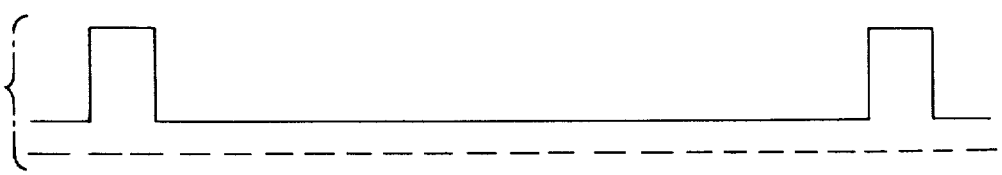

FIGS. 5A, 6A, and 7A with FIGS. 5B, 6B and 7B are waveforms explaining the operation of the circuit of FIG. 2 for high and low speed operation, respectively.

DETAILED DESCRIPTION

Figure 1:
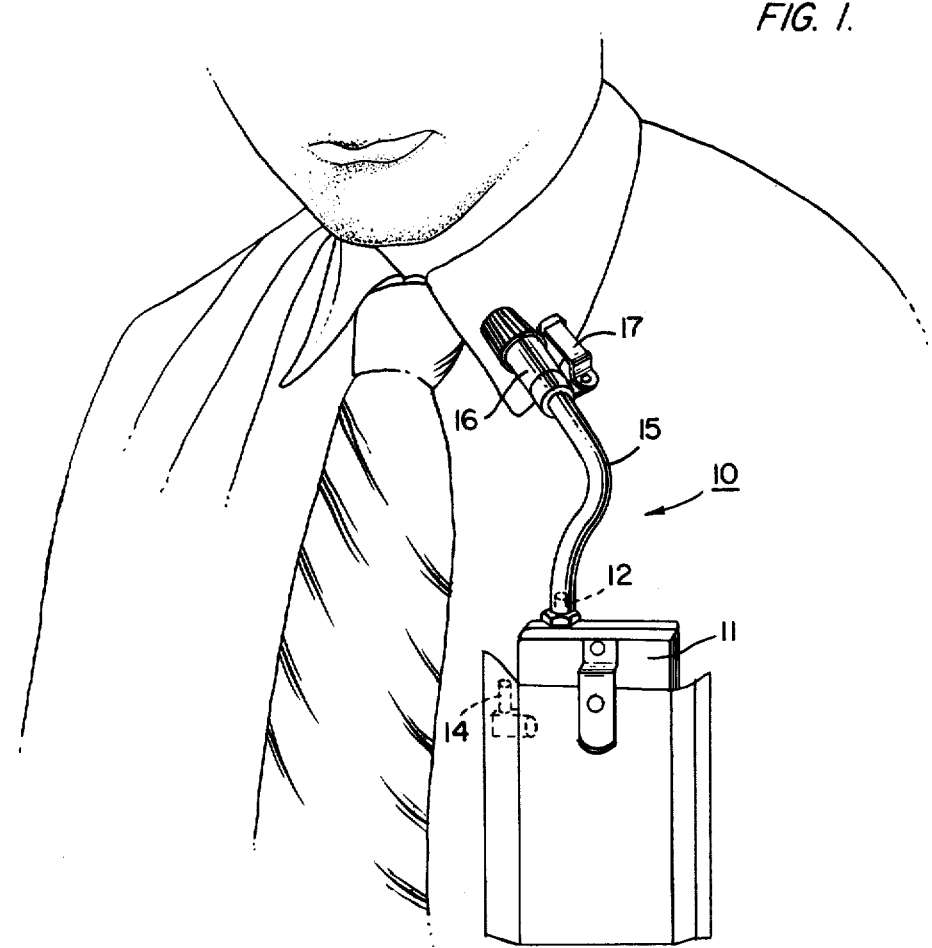
FIG. 1 is a perspective view of the personal air sampler in use.

The personal air sampler 10, in use, is illustrated in FIG. 1. It includes a casing 11 of such a size, about 3.2×6.4×13 cm, as will fit a shirt pocket. The casing contains a three cell rechargeable battery, driving an electric motor powered air pump, speed control circuitry, an overload alarm, a volume pumped indicator, etc., as will be more fully explained below. Details of the air pump are generally similar to those seen in the Sipin U.S. Pat. No. 3,953,152.

The personal air sampler 10 sucks air in through suction port 12 and exhausts it through exhaust port 14, shown in dotted lines.

Suction port 12 is connected by flexible tube 15 to a holder 16 for a sampler tube, such as a chemical detector tube or a colormetric gas dosimeter tube or a charcoal or other sorbent tube or a particulate collector tube. The sampler tube will, after use, provide information on the constituents of the breathing air in the work place. In order to give an accurate indication of conditions of the breathing air near the users nose, the holder for the sampler tube is clipped to the users shirt collar by means of clip 17.

If it is desired to continuously collect a representative sample over the course of the work day, a balloon may be connected to exhaust port 14.

In the circuit, FIG. 2, the source of power 21 is connected between chassis ground at 22 and the on-off switch 23. The bias and reference supply conductors have been emphasized as heavy conductors, in order to make the drawing more readily readable. The switch 23 energizes motor 24 through power switching transistor 25, the circuit being completed by potentiometer 26 back to chassis ground 22. The motor 24 will then run whenever transistor 25 is conductive, at a brush to brush voltage which will be equal to the voltage of battery 21 less any IR losses and the emitter-to-collector voltage drop of power transistor 25. Since these latter two items are quite small, the voltage at the energized motor, can be taken, for the purpose of explanation, as battery voltage.

If the motor 24 is energized in pulse fashion, the motor will act as a generator during the intervals between power pulses. During the intervals between power pulses the motor will coast and slow down at a rate which is determined by the load on the motor. This load will be higher when the motor is set for high speed operation that when it is set for slow speed operation and it will be higher if the sampler tube is partly clogged from use than when the sampler tube is completely open.

The voltage across the motor terminals (less the insignificant drop across potentiometer 26) is applied to the non-inverting input of operational amplifier 30 by way of feedback conductor 31, voltage divider 32, 33 and is low pass filtered by smoothing capaciter 34.

Figure 3:
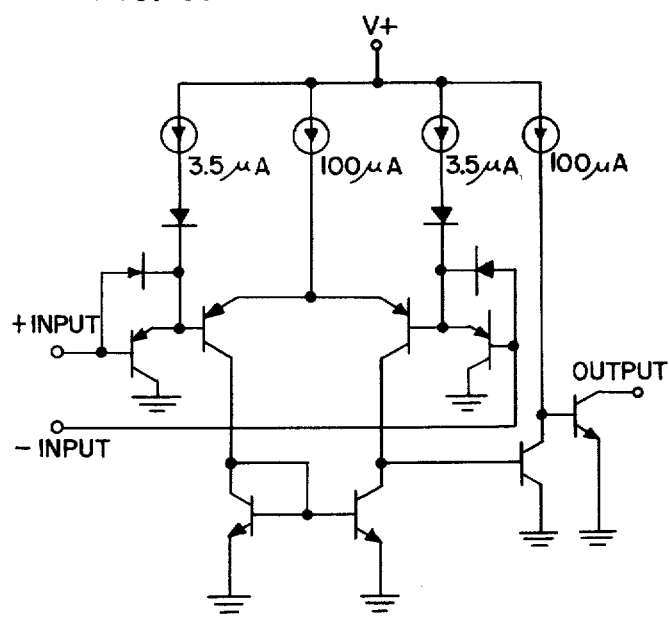
FIG. 3 is a circuit diagram showing the internal circuit details of the voltage comparators used in the circuit of FIG. 2.
Figure 4:
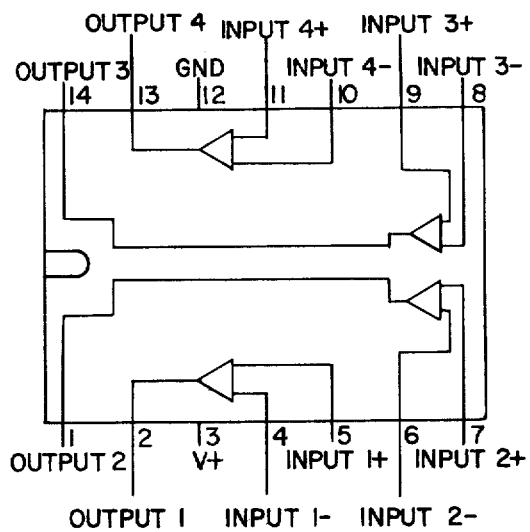
FIG. 4 is a diagram showing how four of the voltage comparators of FIG. 3 are contained in a dual in-line 14 pin package.

Operational amplifier 30 is one of four operational amplifiers contained in a 12 pin package. The internal circuitry of the individual operational amplifiers are shown in FIG. 3, while the package is shown in FIG. 4. The connections for chassis ground pin 12 and V+ pin 3, shown in FIG. 4, are omitted in FIG. 2 in order to simplify the diagram.

The operational amplifier of FIG. 3 has such a high gain that, if there is any difference of over few millivolts between the two input terminals, the output will swing to one or the other of the high or low output limits, depending on the sign of the difference. Thus, these operational amplifiers are often known as voltage comparators, since the output signal can be taken as a binary indication of which of the two inputs is at a higher voltage.

However, operational amplifier 30 is not operated to produce binary pulses, but is operated as a linear class A amplifier, since the signal at output 35 is directly connected to the inverting input of operational amplifier 30. The voltage at output 35 therefore closely follows the voltage at the non-inverting input since operational amplifier 30 operates as a voltage or source follower. The capacitor 36 acts to store and somewhat delay the output voltage.

From the above, it will be evident that the voltage at output 35 will be proportional to the voltage across the terminals of motor 24, both when the motor 24 is powered and when the motor 24 is coasting.

When the motor 24 is under full power, the voltage at the non inverting input of operational amplifier 30 will be high so that the output voltage at point 35 would tend to be high also. However (as seen from the internal circuitry of FIG. 3) the output of operational amplifier 30 is not a source of power, and cannot drive the storage capacitor 36. Instead, since, under this condition, the final stage of operational amplifier is cut-off, storage capacitor 36 charges up slowly from reference voltage of +1.2 volts on reference voltage conductor 40 through resistors 41 and 42. The voltage on conductor 40 is stabilized at reference voltage of 1.2 volts positive by Zenner diode 43 and dropping resistor 44.

The operational amplifier 50 is connected to operate as a bistable switch because of the positive feedback obtained by feedback resistor 51. Triggering of the output at 52 between the high and low states is determined by the relative voltages at the inverting and non-inverting inputs of amplifier 50. The non-inverting input receives a fixed but adjustable bias from reference voltage conductor 40 through resistor 53, adjustable potentiometer 54 and resistor 55. The value of this bias can be checked at test point 56. The value of this bias is adjusted by the setting of potentiometer 54 and can also be adjusted over a high and low range by use of switch 57. Resistor 58 maintains the current through Zenner diode 43 approximately the same for both ranges.

From what has been said it is evident that, starting with a given charge on storage capacitor 36, and assuming the bistable switch including amplifier 50 is in the one of its two stable states wherein its output 52 is high, when a high voltage is applied to feedback conductor 31 the following happens: Operational amplifier 30 cuts off its output transistor; capacitor 36 starts to charge positively in R-C mode from its immediately preceeding voltage; the changing voltage on storage capacitor 36, applied to the inverting input of amplifier 50, eventually overtakes the biasing voltage at the non-inverting input and triggering occurs in amplifier 50 to drive output 52 low. The time duration of this sequence, during steady state operation, is approximately the same for all settings of potentiometer 54.

While the output 52 of amplifier 50 is high it causes the output of amplifier 60 as a duty cycle modulator to be low, which forward biases the emitter junction of transistor 25, thereby effectively applying full voltage from battery 21 to motor 24. This causes motor 24 to speed up.

When the output 52 of amplifier 50 goes low, after the time duration mentioned just above, the amplifier 60 applies a blocking voltage to the emitter junction of transistor 25 and motor 24 is deenergized. However, the motor continues to coast and inherently generates a voltage, the internal back electromotive force, which is applied, via feedback conductor 31, to operational amplifier 30.

During coasting of motor 24, the voltage at output 35 of operational amplifier 30 will be closely proportional to motor speed. It is to be noted that at this time the output transistor of operational amplifier 30 will not be cut off, but will be operational, and source-follower operation of the circuit occurs.

As coasting of the motor continues, the feedback voltage on conductor 31 decreases, and eventually the voltage at output 35 falls below the voltage supplied by the adjustable biasing network, including potentiometer 54, to the non-inverting input of amplifier 50. This causes triggering to again drive output 52 high, which causes transistor 25 to again apply full power to motor 24.

Thus, the motor 24 is energized by a series of pulses of full power, and coasts between pulses. At lower speed settings of potentiometer 54, each of the periods of coasting last longer than at higher speed settings.

The operation of the circuit is set forth in time-graphs in FIGS. 5A to 7B. The suffix A applies to high speed operation while the suffix B applies to low speed operation.

FIGS. 5A and 5B are graphs showing the time variation of voltage existing across motor 24 and applied to feedback conductor 31. It will be seen that during application of full power the motor voltage is fixed (at slightly below battery voltage) and that during coasting the voltage is less and decreases with time. The slope of decrement is greater during high speed operation and when the sampler tube is clogged, because both contitions increase the drag on the motor. It will be noted that at the end of each full power period, there is a large negative going spike. This is caused by inductive kick when the current through the armature is suddenly cut off. The spike is filtered by the smoothing capacitor 34.

FIGS. 6A and 6B show the time variation of voltage on storage capacitor 36 during high and low speed operation, respectively. The two modes of operation, source follower (when operational amplifier 30 operates as a linear amplifier) and R-C charge (when the output stage of operational amplifier 30 is cut off) are indicated.

FIGS. 7A and 7B show the time variation of the voltage on the non-inverting input of amplifier 50. In each of FIGS. 7A and 7B the lower voltage is that established by the bias from the voltage on reference voltage conductor 40 by adjustable potentiometer 54 while the upper voltage is that established by a combination of that bias with the triggering feedback.

It will be seen from what has been described that each application of full power to the motor accellerates it to slightly above the desired speed, and the speed drops between full power pulses to the speed determined by the setting of potentiometer 54. Since the full power pulses are very short, the motor speed cannot go more than slightly above the desired speed. Thus, the actual speed is kept constant in a practical sense, and is not subject to long term fluctuations.

In order to give warning of the fact that the motor 24 is being subjected to overlarge loads (as when a sample tube is clogged) the armature current of the motor is passed through potentiometer 26 and the voltage drop across a portion is applied via an obvious circuit to the non-inverting input of amplifier 70, wherein it is compared with a constant voltage, derived from reference voltage conductor 40 by voltage divider resistors 71 and 72 and applied to the inverting input. Amplifier 70 is also provided with a positive feedback resistor 73 to cause it to trigger from the normal low output to a high output.

It can be seen that, if the armature current through motor 24 becomes very high, the circuit including amplifier 70 will trigger to cause the output 74 to go high. At that time two things happen.

The high output at 74, over a path including resistor 75, raises the non-inverting input of amplifier 60, which blocks the emitter junction of transistor 25, thereby cutting off power to motor 24.

In addition the high output at 74, through resistor 76, turns on transistor 80, which causes light emitting diode 81 to glow and alarm 82 to sound.

The alarm condition will continue, and can be discontinued only by doing two things. First, the basic cause of excessive armature current in motor 24 must be removed and, second, the trigger circuit including amplifier 70 must be unlatched by momentarily opening on-off switch 23.

To facilitate setting the potentiometer 26 to the level of armature current at which triggering is desired, a test point 83 is provided.

The circuit disclosed above has been used in a personal air sampler having the advantageous characteristics specifically set forth in the abstract. It is, however, of general utility in other environments.

What is claimed is:

1. An electric motor speed control system comprising:
    an electric motor;
    a source of power;
    power switch means for connecting or disconnecting said motor to said source of power;
    an operational amplifier connected as a voltage follower having an input and an output;
    means to connect the input of said voltage follower to said motor to sense the voltage applied thereto while said power switch means connects said motor to said source of power and to sense the internal back electromotive force thereof while said power switch means disconnects said motor from said source of power and said electric motor is coasting;
    said voltage follower operating as a linear amplifier rendered inoperative when sensing the larger voltage existing while said electric motor is connected to said source of power;
    a capacitive storage device connected to the output of said operational amplifier;
    resistive means for slowly charging said capacitive storage device while said voltage follower is inoperative to;
    a level corresponding to increasing motor speed;
    whereby, when said motor is disconnected from said source of power, the charge on said capacitive storage device varies directly in one direction with the decreasing speed of said electric motor while coasting; and
    whereby, when said electric motor is connected to said source of power, the charge on said capacitive storage device receives current through said resistive means.

2. The electric motor control system of claim 1 comprising further:
    bistable means connected as a voltage comparator having a pair of inputs;
    means to connect one of the inputs of said comparator to said capacitive storage means; and
    means to connect the other of the inputs of said voltage comparator to a reference voltage.

3. The electric motor control circuit of claim 2 comprising further:
    means to vary the said reference voltage in accordance with a desired running speed of said electric motor.

4. The system of claim 3 in combination with:
    a volume pump connected to said electric motor;
    said volume pump pumping at a rate directly proportional to the running speed of said electric motor; and
    a sampler tube connected in series with said pump.

5. In a speed control system for an electric motor (24) including a power switch (25) connecting and disconnecting an armature of the motor to a power source (21) from which an operating voltage is applied, a comparator (50) having a first input to which a motor coasting signal voltage is applied, a second input to which a reference voltage is applied and an output (52) connected by a duty cycle modulator (60) to the power switch for controlling the speed of the motor, the improvement residing in a signal monitoring device (30) having means for operation thereof as a linear voltage amplifier continuously following the voltage across the motor armature to supply said signal voltage to the first input and means responsive to the operating voltage being applied to the motor for cutting off the signal voltage to the first input, feedback means (51) connected to the comparator (50) for operation thereof as a bistable switch controlled by the signal voltage, and current sensing means (70) connected to the modulator (60) for preventing application of the operating voltage to the motor through the power switch in response to overload current in the motor armature.

6. The system as defined in claim 5 including capacitor means (36) connected to the first input of the comparator for discharge thereto during supply thereto of said signal voltage, and means for charging the capacitor means independently of the signal monitoring device during cut off of the signal voltage.

7. In a speed control system for an electric motor (24) including a power switch (25) connecting and disconnecting an armature of the motor to a power source (21) from which an operating voltage is applied, a comparator (50) having a first input to which a signal voltage is applied, a second input to which a reference voltage is applied and an output (52) operatively connected to the power switch for controlling the speed of the motor, the improvement residing in a feedback signal device (30) continuously connecting the motor armature to said first input for supply thereto of a signal voltage following the voltage across the motor armature, and delay means (31–41) for cutting off the signal voltage to the first input when substantially equal to the operating voltage whereby power pulses for the motor of substantially fixed duration are obtained.

8. The system as defined in claim 7 wherein said delay means includes capacitor means (36) connected to the first input of the comparator for discharge thereto during supply thereto of said signal voltage, and means (41) for charging the capacitor means independently of the feedback signal device during cut off of the signal voltage while the motor is being pulsed at the operating voltage.

* * * * *